Sept. 3, 1935.　　　H. M. DRESSEL　　　2,013,513

VIBRATOR

Original Filed March 3, 1934　　2 Sheets-Sheet 1

INVENTOR
HENRY M. DRESSEL
BY Robert L. Kahn
ATTORNEY.

Sept. 3, 1935.  H. M. DRESSEL  2,013,513
VIBRATOR
Original Filed March 3, 1934   2 Sheets-Sheet 2
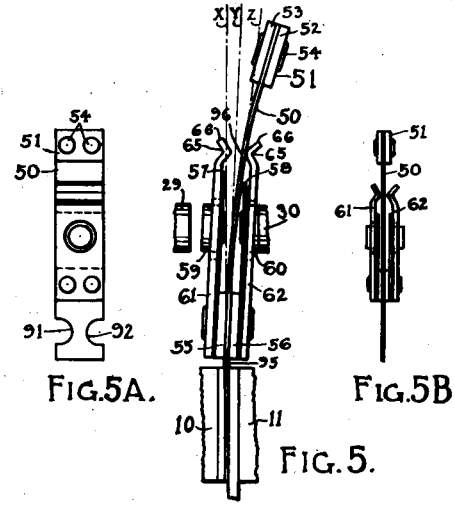
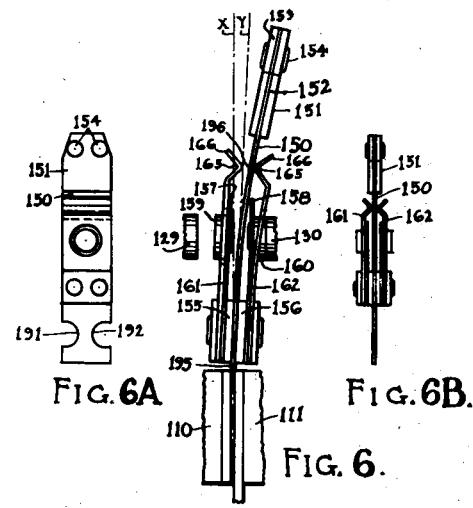
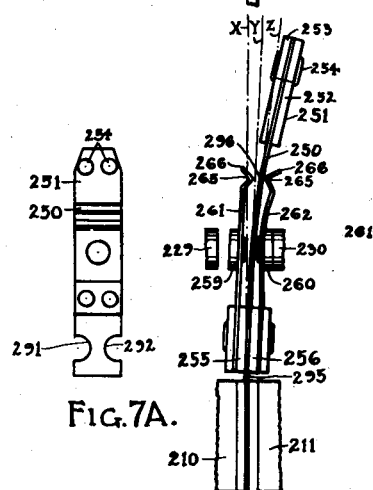
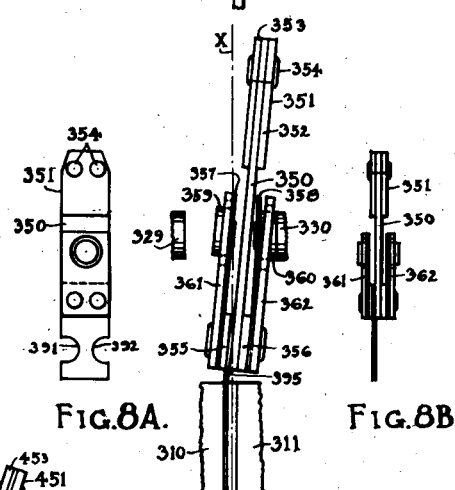
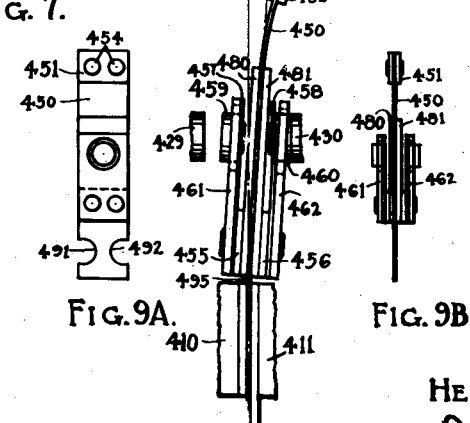
INVENTOR
HENRY M. DRESSEL
BY Robert L. Kahn
ATTORNEY.

Patented Sept. 3, 1935

2,013,513

UNITED STATES PATENT OFFICE 2,013,513

VIBRATOR

Henry M. Dressel, Chicago, Ill., assignor to Oak Manufacturing Company, Chicago, Ill., a corporation of Illinois Refile of abandoned application Serial No. 713,827, March 3, 1934. This application March 14, 1935, Serial No. 11,180

13 Claims. (Cl. 175—365)

This invention relates to electrical apparatus and particularly to current interrupters or vibrators. In the installation of radio receivers in automobiles, aeroplanes and the like it is desirable that all circuits in the receiver be energized from a single source of energy, such as a storage battery. In order to obtain high potential direct current for the plate circuits of the vacuum tubes of the receiver, it is customary to interrupt the current supplied by a storage battery to a transformer and then step up these voltages to a sufficiently high potential for use in the receiver. Rectification and filtration are relied upon to smooth out the high potential currents.

Great difficulty has been experienced in devising an interrupter which would be simple, compact, cheap and reliable. An object of this invention is to devise an interrupter which will have the above advantages and which, in addition thereto, will not generate an undue amount of noise. An additional object is to devise such an interrupter which will have desirable mechanical characteristics while at the same time be capable of maintaining its electrical performance efficiently.

Referring to drawings, Figure 1 is a sectional elevation of a vibrator embodying this invention on line 1—1 of Figure 3.

Figure 5 is a side view of the reed in deflected position.

Figures 5A and 5B are front and side views respectively of the same reed in normal position.

Figure 2:
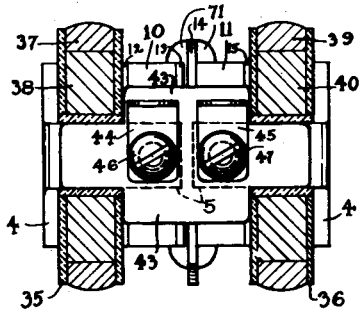
Figure 2 is a sectional view on 2—2 of Figure 1.

Figures 6 to 9 inclusive, together with the associated Figures A and B are modifications of reeds.

The vibrator in general comprises two main supporting members, 1 and 2, both preferably of magnetic material. Supporting members 1 and 2 have bent portion 3 terminating in a supporting portion 4. At the top of each supporting portion 4 the metal is cut away to form a narrow pole piece 5. The bottom of members 1 and 2 are separated by a pair of lava blocks 10 and 11. On each side of blocks 10 and 11 are metallic spacer members 12, 13, 14 and 15. Insulating sleeves 17 are adapted to pass interiorly of said lava blocks and metallic members through suitable apertures therein. Bolts 18 fit snugly within sleeve 17 and each head 19 and nut 20 are insulated from the two members 1 and 2 by means of insulating washers 21 and 22.

Members 1 and 2 are adapted to support a pair of stationary contacts above the lava assembly and for this purpose have suitably threaded apertures 25 and 26 into which hollow bolts 27 and 28 are threaded. The inside ends of these bolts carry contacts 29 and 30 made of suitable material such as tungsten. Lock nuts 31 are provided for each hollow bolt to further retain the contacts in fixed adjustment.

Supported within the curved portions 3, 4 and 5 of main supports 1 and 2 are a pair of spools 35 and 36, each of said spools having a pair of windings 37, 38 and 39, 40. In order to maintain spools 35 and 36 rigidly in position a plurality of strips 42 of mica are disposed above pole pieces 5. These mica strips have intermediate portions 43 between the opposing sides of spools 35 and 36 widened out so as to bear against the walls of the spools. A pair of lugs 44 and 45 are bolted by screws 46 and 47 to the ends of portions 5. These bolts retain the mica strips in position and make a rigid assembly for the two coils.

The vibrating structure comprises a reed 50, preferably of spring steel, carrying an armature 51 at one free end thereof. It will be noted that armature 51 is composed of two small blocks 52 and 53, symmetrically disposed about the end of reed 50 and riveted at 54. Reed 50 extends downwardly and has its bottom end rigidly clamped between metallic plates 13 and 14. In order that the lower portion of reed 50 may clear bolts 18, semicircular cut-outs 91 and 92 are provided.

A short distance above the insulating assembly retaining the reed in place is a movable contact assembly. This comprises a pair of metallic blocks 55 and 56 disposed on each side of reed 50. On the outside of each block there is disposed a light spring 57 and 58, each carrying at the free end thereof a movable contact 59 and 60. These contacts are so disposed as to co-operate with stationary contacts 29 and 30. On the outside of light springs 57 and 58 and overlying them are a pair of rigid members 61 and 62, the entire assembly being riveted together by rivets 63. Members 61 and 62 have suitable apertures 64 through which movable contacts 59 and 60 may project. The free ends of 61 and 62 are bent inwardly at 65 to provide a narrow gap 67 and are then flared outwardly at 66.

The entire structure may be supported by extending metallic plate 14 below the assembly and providing a mounting portion 70. This portion is suitably apertured and has a pair of soft rubber grommets 71 disposed in the apertures 72. A supporting member 75 has its apertured end 76 disposed against the outside of said grommets and the entire assembly riveted at 77. Supporting member 75 may be bolted at 80 to any suitable support such as a base similar to that provided for vacuum tubes.

Figure 4:
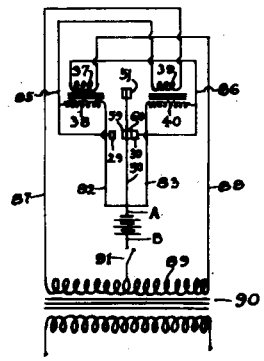
Figure 4 shows a circuit diagram of the buzzer and transformer.

Referring to Figure 4, a wiring description of the buzzer will be given.

Reed 50 carrying movable contacts 59 and 60 is connected to one terminal A of a battery. Connected to reed 50 are a pair of wires 82 and 83 leading to voltage coils 38 and 40 on spools 35 and 36. The other end of coil 38 is connected to a wire 85 which runs to stationary contact 29. The other end of coil 40 is connected to wire 86 running to other stationary contact 30. Wires 85 and 86 lead to coils 39 and 37 respectively and thence terminate in leads 87 and 88 for connection to primary 89 of a transformer 90. The center of primary 89 is connected through a switch 91 to point B of the battery.

As indicated in Figure 4, current coils 37 and 39 have relatively few turns of coarse wire in comparison to coils 38 and 40. This is because coils 37 and 39 each carry a current going through one-half of primary 89 while coils 38 and 40 need not carry very much current.

Figure 1:
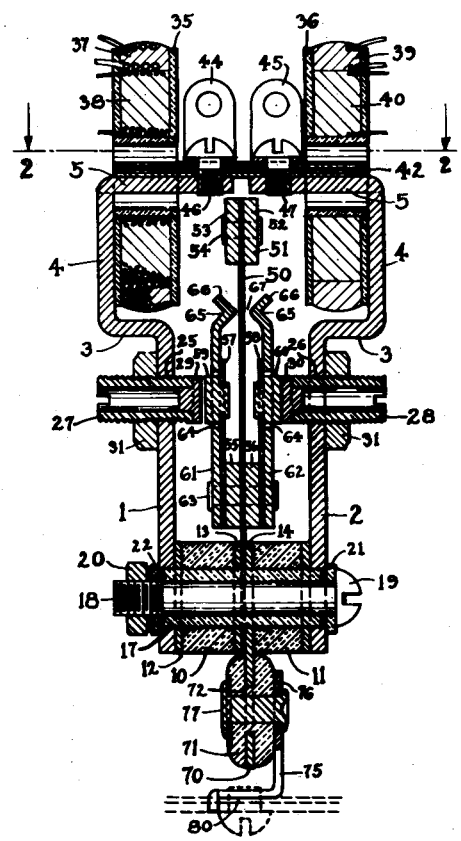
Figure 3:
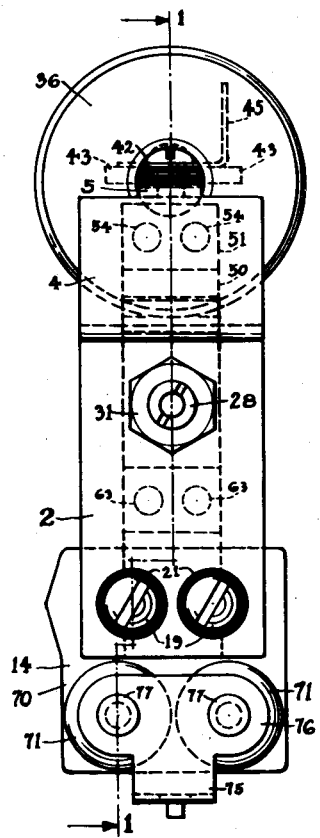
Figure 3 is a side elevation of the buzzer.

The operation of the vibrator is as follows. In position of rest, as shown in Figure 1, contacts 30 and 60 are closed. Assuming that switch 91 is closed, current will flow from terminal A through reed 50, contacts 60 and 30, wire 86, through coil 37, wire 88, right hand half of primary 89, switch 91, to terminal B. At the same time, current will flow from reed 50, wire 82, through voltage coil 38, wire 85, current coil 39, wire 87 and the left hand half of primary 89, back through to the battery. Inasmuch as the resistance of voltage coil 38 is much greater than current coil 37, the current through the left hand half of primary 89 will be negligible in comparison to that in the right hand half of primary 89. However, both coils 37 and 38 co-operate to attract armature 51 and pull it to separate contacts 60 and 30. Thereupon contacts 29 and 59 close, with the result that coil 38 is shorted out and the circuit for coil 37 is opened. Upon the closure of contacts 29 and 59, coils 39 and 40 are both energized. Hence, the alternating energy of both sets of coils maintains the reed in continuous vibration and results in the battery current flowing through alternate halves of primary transformer 89.

In the event that the movable contact tends to freeze to one of the stationary contacts, it is evident that the tendency for the armature to be pulled away from the frozen position will be correspondingly greater. The lower the contact resistance, the greater the current through either of current coils 37 or 39 and hence the greater the pull on the armature to free the contacts.

Referring to Figure 5, the vibrating element illustrated in the preceding figures is shown in detail. In Figure 5, the reed is shown fully deflected so that contacts 30 and 60 are tightly pressed together. For convenience in analysis of the deflection of reed 50, some vertical axes have been drawn. The X axis is a normal center line on which reed 50 lies when at rest. However, when the reed vibrates it tends to change curvature at several different regions. In the first part of its journey from the X axis the reed tends to bend from blocks 55 and 56 as a fulcrum. Upon striking the bend in portion 65 of heavy spring member 62 there is a tendency for the reed to bend around point 96 as a fulcrum and also to bend the entire vibratory structure at region 95.

Movable contact 60, which is carried by a spring member 58, has an outward bias so that when the entire vibratory structure is in the position shown in Figure 5, spring 58 presses contact 60 against stationary contact 30.

Of course it is to be understood that the unsymmetrical location of the movable contacts with respect to the fixed contacts has a tendency to shift the neutral or central axis from the geometrical center of the device. However, this only affects the magnitudes of the forces in each position of the reed.

Due to the action of the reed, there is a great tendency for vibrations along reed 50 downwardly to be out of phase with vibrations travelling along contact bearing springs 57 and 58 downwardly and some neutralization is effected at region 95 of the reed. This results in a marked decrease of noise transmitted by the device itself.

A certain amount of sliding motion exists between reed 50 and heavy spring member 62 at point 96 and while this sliding is slight, nevertheless it is sufficient to dissipate a substantial amount of energy. The friction between the two surfaces at this point functions as a damping medium.

The Y vertical axis shows the deflection at region 95 of reed 50, while the Z axis shows deflection between blocks 55 and 56 and region 96 of the reed.

The actual angles shown are greatly magnified. Actually, the Y axis is very close to the X axis as pointed out above.

It will be noted that in the operation of the structure shown in Figure 5, reed 50 is permitted to travel freely past the center axis X, having gathered considerable momentum from the release of energy of the spring system on one side thereof. As the reed goes past dead center to this opposite extreme position, it begins to store a considerable quantity of potential energy in the various springs, as well as dissipate some energy at the junction of the various springs. The net result is that when the contacts strike, the impact is substantially constant, irrespective of the speed of travel of reed 50 within wide limits. This is because the absorption of energy in the spring system is directly related to the speed of travel of the reed.

In Figure 6, spring members 161 and 162 are substantially lighter than 61 and 62 and more nearly approximate the spring qualities of reed 150. In this case, there is a greater deflection at region 195 of the reed but very little at point 196. The deflection of spring members 161 and 162 from their normal position is much greater, resulting in a substantially greater amount of relative motion between the two at point 196. The damping at this region serves to absorb a certain amount of energy and maintains a substantially constant impact between contacts.

In both Figures 5 and 6, the reed when pulling away from one position toward the opposite position tends to gather considerable momentum before the closed contacts are opened. This results in an extremely sharp break.

In Figure 7, the side spring members 261 and 262 carry the movable contacts 259 and 260. In this case, a certain amount of deflection around point 296 of the reed takes place because of the vertical stiffening of spring 262, due to the pressing action at the contact points. Spring members 261 and 262 are thus effectively shortened and stiffened upon closure of the contacts. This stiffening action, together with the wiping action at reed 296, functions to relieve the contacts from any abnormal impact and thus maintain the contact impact at a substantially constant value.

In Figure 8, reed 350 is much stiffer and comparable to stiff spring members 361 and 362. Practically all the deflection occurs from region 395. Upon establishment of contact, spring 357 or 358, as the case may be, yields and permits the vibrating structure to travel to its terminal position.

In Figure 9, reed 450 has two heavy springs 480 and 481 extending upwardly on opposite sides thereof for a substantial portion of its length. Part of the deflection of the structure occurs at region 495 while the rest of the deflection occurs beyond the ends of springs 480 and 481. Lighter springs 457 and 458 function to transmit a substantially constant amount of energy to the contacts.

In the various modifications, a different reed action is obtained. However, it will be noted that in Figures 5, 6, 7, and 9 a plurality of fulcrum points exists, about which portions of the reed may deflect. Furthermore, in Figures 5, 6, 8, and 9, a spring system distinct from the vibratory system and in opposition thereto for a part of the time serves to impart a substantially constant amount of energy to the contacts in spite of wide variations of energy in the reed system itself. In these figures a positive break is provided for the contacts, this break being made at the time when the reed is going through its central position and has a maximum of kinetic energy.

The proportion of energies in the voltage and current coils may be adjusted to any desired degree. Both sets of coils aid each other so that the total energy in the magnetic field may be constant irrespective of the relative magnetizing values of the voltage and current coils.

The proportion of energies in the voltage and current coils may be adjusted to any desired degree. Both sets of coils aid each other so that the total energy in the magnetic field may be constant irrespective of the relative magnetizing values of the voltage and current coils.

Furthermore, because of the electrical symmetry of the system, it is clear that the makes and breaks of the contacts may be readily adjusted to occur at zero potential. It is true that the physical eccentricity of the reed may cause a departure from the relationship but in practice it is so slight as to be negligible.

This application is a refile of my abandoned application Serial Number 713,827, filed March 3, 1934.

What I claim is:

1. An interrupter comprising a frame of magnetic material, said frame having a pair of pole pieces at one end thereof, at least one coil for magnetizing said frame, a reed rigidly mounted at one end thereof at the opposite end of said frame, said reed bearing an armature at its free end for vibration in proximity to said pole pieces, a pair of stationary contacts carried by said frame on opposite sides of said reed, a pair of spring members carried by said reed on opposite sides thereof, a movable contact mounted on each spring member for co-operation with said stationary contacts and an additional spring member carried by the reed external to each of said contact bearing springs, the two springs on one side of the reed being biased toward each other.

2. The structure of claim 1 wherein the free ends of the outer springs extend beyond the contact bearing springs and are bent toward the reed.

3. An interrupter comprising a frame of magnetic material, said frame having a pair of pole pieces at one end thereof, at least one coil for magnetizing said frame, a reed having a free end adjacent to said pole pieces and its other end rigidly mounted at the end of said frame remote from such pole pieces, an armature carried by said reed for vibration in proximity to said pole pieces, a pair of stationary contacts carried by said frame on opposite sides of said reed, a pair of spring members carried by said reed on opposite sides thereof, a movable contact mounted on each spring member for co-operation with said stationary contacts and a rigid member carried by the reed on each side thereof overlying the exterior of each spring member, each spring member being outwardly biased toward the adjacent rigid member.

4. The structure of claim 3 wherein said rigid members extend beyond the ends of said spring members and have their free ends bent toward the reed.

5. An interrupter comprising a pair of elongated magnetizable members, a pair of insulating blocks disposed between one end of each of said members, a reed having one end disposed between said pair of insulating blocks, means for rigidly clamping said assembly together, the free ends of said members having their ends bent toward each other to provide a pair of pole pieces, an armature carried by said reed for vibration in proximity to said pole pieces, a magnetizing coil disposed around one of said pole pieces, solid insulating material bridging said pole pieces and rigidly joined thereto and serving to maintain said pole pieces rigid, said insulating material being wedged into said coil and serving to maintain said magnetizing coil in position, a pair of contacts carried by said members, one on each side of said reed, and at least one movable contact carried by said reed for co-operation with said stationary contacts.

6. The structure of claim 5 wherein said reed has a spring member on each side thereof, each spring member carrying a movable contact and an additional member on said reed on each side thereof and exterior to said spring member, each spring member being outwardly biased and said additional member serving as a stop.

7. An interrupter comprising a magnetic frame having a pair of pole pieces, at least one magnetizing coil therefore a reed mounted for vibration and having an armature at one free end thereof, said reed being rigidly secured at its other end, a stationary contact carried by said frame on each side of said reed and at a point remote from the rigid end of said reed, a spring mounted on each side of said reed at a point adjacent the rigid portion of said reed and extending parallel thereto toward the free end of said reed, a movable contact carried by each spring for co-operation with said stationary contacts, and an additional member on each side of said reed overlying said contact bearing spring members.

8. The structure of claim 7 wherein said overlying member is sufficiently rigid to function as an abutment for the adjacent spring member.

9. The structure of claim 7 wherein said overlying member extends beyond said contact bearing spring members and has its free end portion bent towards said reed.

10. An interrupter comprising one pair of elongated magnetizable members, each one having an end bent to form a pole piece, means for rigidly supporting said members at the other end, said means comprising a pair of insulating blocks, a reed mounted between said insulating block and extending towards said pole pieces and having an armature at its free end, at least one magnetizing coil, a stationary contact carried by each member, a spring rigidly mounted on each side of said reed at a point adjacent said insulating blocks, said springs extending toward said stationary contacts, a movable contact carried by each spring for co-operation with a corresponding stationary contact, a member carried by said reed on each side thereof overlying said spring and secured at a point on said reed near said insulating blocks, said two spring members being outwardly biased, and a bridge of insulating material rigidly joined to said pole pieces and maintaining the same in fixed position.

11. In combination, a transformer having a secondary and a split primary, a direct current circuit including an interrupter connected to said primary, said interrupter comprising two magnetic circuits including a pair of pole pieces, a pair of coils for magnetizing said magnetic circuits, a reed having an armature adapted to vibrate in proximity to said pole pieces, a stationary contact on each side of said reed, a movable contact carried by said reed for alternate co-operation with each stationary contact and connections whereby each coil is alternately energized by the operation of said contacts.

12. A vibrator comprising a frame comprising two magnetic circuits having a pair of spaced pole pieces, a pair of magnetizing coils for each circuit, a reed having an armature adapted to vibrate in proximity to said pole pieces, contacts carried by said reed, a stationary contact on each side of said reed, and connections whereby each coil is alternately energized by the vibration of said reed and operation of said contacts.

13. The structure of claim 12 wherein each magnetic circuit has a pair of magnetizing coils, one coil on each magnetic circuit being in series with one pair of co-operating contacts and the other coil on the same magnetic circuit being in parallel to the same pair of co-operating contacts.

HENRY M. DRESSEL.